United States Patent [19]

Akkerman

[11] Patent Number: 5,411,096

[45] Date of Patent: May 2, 1995

[54] SURFACE CONTROLLED, SUBSURFACE TUBING SAFETY VALVE

[76] Inventor: Neil H. Akkerman, 15106 Beacham, Houston, Tex. 77070

[21] Appl. No.: 255,460

[22] Filed: Jun. 8, 1994

Related U.S. Application Data

[63] Continuation of Ser. No. 934,174, Aug. 21, 1992, abandoned.

[51] Int. Cl.$^6$ ............................................. E21B 34/10
[52] U.S. Cl. .................................. 166/321; 251/63.4; 251/335.3
[58] Field of Search ................. 166/321, 332, 319; 251/335.3, 61, 63.4, 61.2, 62

[56] References Cited

U.S. PATENT DOCUMENTS

| | | | |
|---|---|---|---|
| 2,786,535 | 3/1957 | Boer et al. | 251/62 X |
| 2,798,561 | 7/1957 | True | 251/62 X |
| 3,747,618 | 7/1973 | Boes | 137/80 |
| 3,860,066 | 1/1975 | Pearce et al. | 166/72 |
| 3,865,141 | 2/1975 | Young | 137/629 |
| 3,981,358 | 9/1976 | Watkins et al. | 166/224 |
| 4,325,431 | 4/1982 | Akkerman | 166/117.5 |
| 4,429,620 | 2/1984 | Burkhardt et al. | 251/62 X |
| 4,467,870 | 8/1984 | Langham | 166/321 |
| 4,475,598 | 10/1984 | Brakhage, Jr. et al. | 166/321 |
| 4,513,944 | 4/1985 | Adams, Jr. | 166/319 X |
| 4,890,674 | 1/1990 | Le | 166/319 |

FOREIGN PATENT DOCUMENTS

| | | |
|---|---|---|
| 2112041 | 7/1983 | United Kingdom . |
| 2134564 | 8/1984 | United Kingdom . |
| 2209043 | 4/1989 | United Kingdom . |
| 2237307 | 5/1991 | United Kingdom . |
| 9011429 | 10/1990 | WIPO . |

OTHER PUBLICATIONS

2-Page Brochure, "Type PB Subsurface Safety Valve," Flopetrol Johnston Schlumberger—SMP 4038.

Primary Examiner—Hoang C. Dang
Attorney, Agent, or Firm—Vaden, Eickenroht, Thompson, Boulware & Feather

[57] ABSTRACT

There is disclosed a surface controlled, subsurface tubing safety valve having a tubular body with a bore therethrough disposable in a tubing string, and a flapper which is movable within the body between open and closed positions and yieldably urged toward its closed position. The flapper is adapted to be opened by a flow tube which is vertically reciprocable within the body between upper and lower positions. The flow tube is yieldably urged to its upper position to permit the flapper to close, and is lowered to open the flapper by a flexible bellows which has a well pressure on one side and a pressure chamber on one side containing hydraulic fluid which is displaced to cause the bellows to move between expanded and contracted positions in response to the exhaust or supply of control fluid from a source at the surface, the bellows being connected to the flow tube to lower it as the bellows is moved to one position and to permit it to rise as the bellows moves to the other position.

20 Claims, 8 Drawing Sheets

SURFACE CONTROLLED, SUBSURFACE TUBING SAFETY VALVE

This application is a continuation, of application Ser. No. 07/934,174, filed Aug. 21, 1992, now abandoned.

This invention relates generally to surface controlled, subsurface safety valves for controlling flow within a tubing string suspended within a well bore. More particularly, it relates to improvement in valves of this type in which a closure member mounted within the bore of a tubular body disposable within the tubing string is yieldably urged by spring means to a position closing the bore, and a flow tube reciprocable in the bore is adapted to be lowered to open the closure member in response to the supply of hydraulic fluid pressure from a remote source at the surface to pressure-responsive means associated with the flow tube.

Ordinarily, a valve of this type is adapted to close automatically in response to the exhaust of such fluid in the event of failure of a monitored condition in or about the well. The body may be retreivable from within the tubing string, or the body may be connected as part of the tubing string—i.e., the valve may be tubing mounted. This invention contemplates that the valve may be of either type. In some such valves, the closure member is a valve, and, in others, the closure member is a flapper. Generally, a flapper is preferred.

When such valves are installed at substantial depths below the surface, dynamic elastomeric seals including that between a piston of the pressure-responsive actuator and the cylinder in which it slides are highly susceptible to failure. It was therefore proposed, in accordance with U.S. Pat. No. 4,325,431, to mount such seals on tools removably disposable within side pockets in the bore of the body, whereby the tool may be retrieved to permit replacement of the seals when required. However, the seals may fail before retrieval of the tool, and, in any event, removal and replacement of the tool leaves the well without control during the interim and involves loss of time and expense to the operator.

It has also been proposed to replace the elastomeric seals with metal-to-metal sealing surfaces. These, however, are not only expensive, but also susceptible to damage and failure due to scratches or the like causing them to fail.

There is therefore a need for and an object of this invention to provide a valve of this type which overcomes these problems in that it requires no dynamic seals, whether elastomeric or metal-to-metal.

This and other objects are accomplished, in accordance with one novel aspect of the present invention, by a valve of the type described wherein the flow tube is lowered to open the closure member, preferably a flapper, by means which includes a metal bellows having well pressure on one side and a pressure chamber on the other side containing hydraulic fluid which is displaced to cause the bellows to move between expanded and contracted positions in response to the exhaust or supply of control fluid from a source at the surface, and means connecting the bellows to the flow tube to lower the flow tube as the bellows moves to one position and to permit the flow tube to rise as the bellows moves to the other position.

It is necessary that the bellows for lowering the flow tube, and thus opening the flapper, be flexible and supple in order to produce the stroke necessary for this purpose. However, bellows having this characteristic are also of the low pressure type, and thus might be damaged by the high hydrostatic pressure of the hydraulic fluid in the control line at substantial depths below the surface. Hence, there is a need for and a further object of this invention is to provide a valve of this latter type in which the bellows or other actuator for the flow tube is protected against this sort of damage.

This and other objects are accomplished, in accordance with another novel aspect of the invention, by a valve of the type above described also including means including a flexible metal membrane means which divides the first chamber on one side thereof from a second pressure chamber on the other side thereof to which the control fluid may be supplied, and means in the second chamber which limits flexure of the membrane means, responsive to the supply of control fluid thereto, so as to displace a volume of hydraulic fluid in the first chamber which is not substantially greater than that required to lower the flow tube to open the closure member. Consequently, the membrane means sees the pressure differential across it only when fully moved to its limited position, and the bellows for actuating sees only the pressure differential due to the pressure of fluid in the first chamber which is necessary to lower the flow tube against the resistance of the means which yieldably urges the flow tube to its upper position.

In accordance with one embodiment of the invention, the means including a metal membrane means comprises a plurality of metal bellows each having an open end connected to the first chamber so that control fluid is on the outer side thereof and the hydraulic fluid in the first chamber is on the inside thereof, and means is provided within the bellows to limit the extent to which they may be collapsed and thus the volume of fluid to be displaced thereby.

In an alternative embodiment of the invention, the metal memrane means comprises a flexible metal diaphragm dividing the first and second chambers, with the diaphragm being flexible into engagement with a well in the first chamber to limit its displacement.

In still another alternative embodiment of the invention, the metal membrane means comprises a plurality of flexible tubes open at one end to connect with the first chamber and surrounded by control fluid in the second chamber, and means in each tube onto which the tube collapses to limit the volume of fluid displaced.

There is a further problem in the use of valves of this type wherein the well pressure beneath the closed closure member is so great, particularly at substantial depths, that it may not be possible or at least difficult to open the flapper with the flow tube without damage to the actuating mechanism. Hence, such valves often include means by which the pressure across the flapper is equalized as the flow tube is lowered to engage the flapper. However, the equalizer may malfunction, and, in any case, many operators do not want valves of this type to have equalizers which are potential risks if they are inadvertently opened. There is therefore a need for and a further object of this invention to provide a valve of the type described in which the actuating mechanism is protected from damage until such time that the pressure differential across the flapper is sufficiently low as to permit the flow tube to open it without causing such damage.

For this purpose, the preferred embodiment of the invention also includes means for accumulating energy in response to displacement of fluid in the first chamber to lower the flow tube against the closed flapper, but prior to opening of the flapper, and then releasing the accumulated energy to further lower the flow tube to open the flapper only upon a substantial balance of pressure across the flapper. As illustrated, the means for accumulating and releasing energy comprises spring means adapted to be compressed by lowering of the flow tube, due to displacement of fluid in the first chamber, prior to lowering of the flow tube to open the closure member, and spring, as the flapper opens, lower the flow tube.

Prior valves having this sort of spring arrangement, are of complex and expensive construction. Thus, for example, the valve of U.S. Pat. No. 3,865,141 has telescoping parts in which particles may accumulate to cause them to jam. There is therefore a further need for and an object of this invention to provide such a valve having a simpler and less expensive arrangement of springs for so accumulating and releasing energy for this purpose.

This and other objects are accomplished, in accordance with the present invention, by a valve of the type described in which a ring is carried between the flow tube and body intermediate shoulders about the tube for vertical reciprocation with respect to both the flow tube and body, with a first spring means compressed between the ring and a lower shoulder of the flow tube, and a second spring means compressed between the ring and a lower shoulder of the body, whereby upon the exhaust of hydraulic fluid from the chamber formed by the pressure-responsive actuator connected by a rod to the flow tube, the ring is raised against the shoulders of both the flow tube and body to raise the flow tube to a position to permit the flapper to close, but, upon the supply of hydraulic fluid thereto, both spring means are compressed to lower the flow tube against the flapper, and, if the flapper is not opened, to continue to lower the ring to further compress both spring means so as to store energy in the first spring means. Thus, upon opening of the flapper, the first spring means expands to further lower the flow tube and fully open the flapper.

In valves of this or similar types having actuators which respond to the displacement of a fixed volume of hydraulic fluid, the actuator may be damaged by the expansion or contraction of the fluid due to substantial pressure and/or temperature fluctuations in the well, and it is, therefore, still another object to provide such a valve in which the actuator is protected from damage despite such abberations.

Conventionally, in valves of this type, both the actuator and the spring arrangement for raising the flow tube are installed within the valve body, requiring that the body be quite large, and thus expensive for containing pressure within the valve. A still further object is to provide a valve of this type in which the size of the valve body is considerably smaller.

In the drawings, wherein like reference characters are used throughout to designate like parts.

Figures 1, 3:
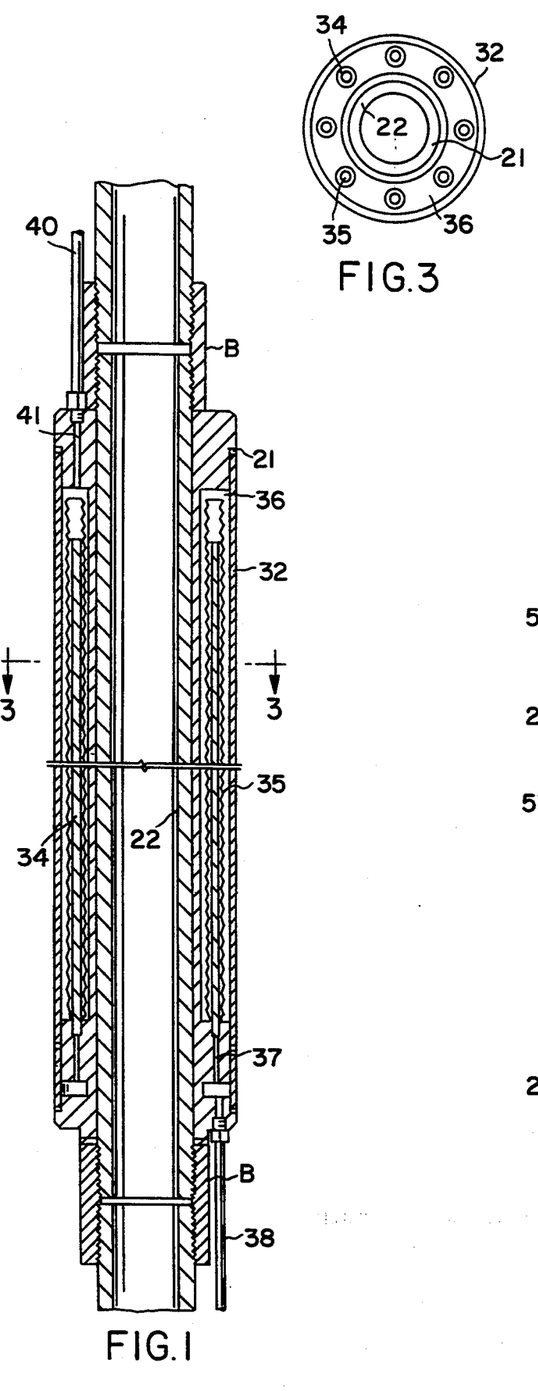
FIGS. 1 and 2 are longitudinal sectional views of the upper and lower ends, respectively, of a tubing safety valve constructed in accordance with one embodiment of the present invention, with the flow tube raised to permit the flapper to close prior to the supply of hydraulic fluid to the valve through the control line, and showing in FIG. 2 the spring arrangement in which energy may be accumulated.
FIG. 3 is a cross sectional view of the valve of FIGS. 1 and 2, as seen along broken lines 3—3 of FIG. 1.
Figure 2:
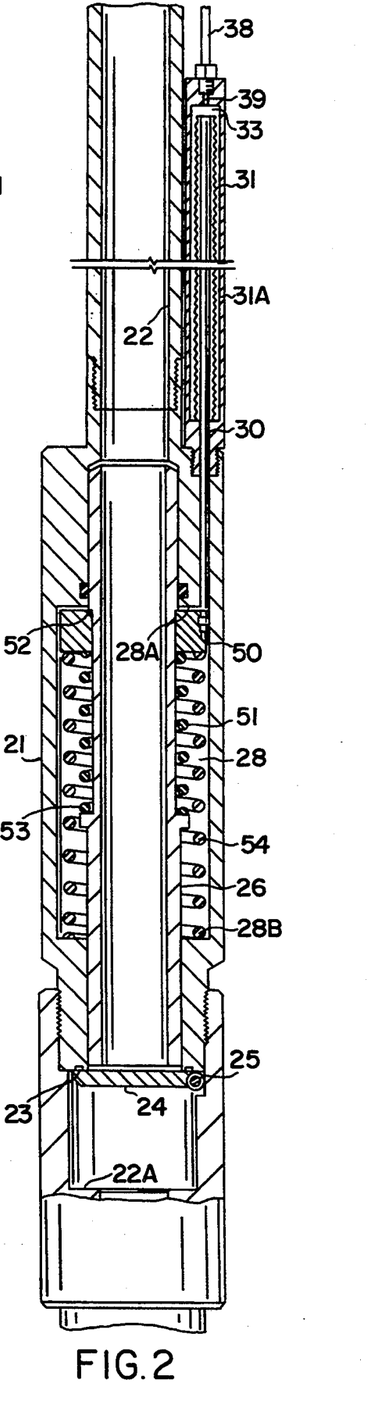

With reference now to the details of the above described drawings, the overall valve shown in FIGS. 1 and 2 comprises a tubular body 21 connectible at its upper and lower ends within a tubing string suspended within a well casing (not shown). As well-known in the art, the valve is normally installed at a substantial depth beneath the surface, and thus in an environment in which well pressure as well as bottom hole temperatures are high. As shown, the body 21 has a bore 22 therethrough which forms a continuation of the inner diameter of the tubing string, and which has a seat 23 at its lower end adapted to be opened and closed by means of a flapper 24 pivotally connected at one side to the bore by means of a pin 25. As well-known in the art, the flapper is normally urged to the closed position of FIG. 2 by means of a torsion spring disposed about the pin and acting between the body and the flapper.

Figure 4:
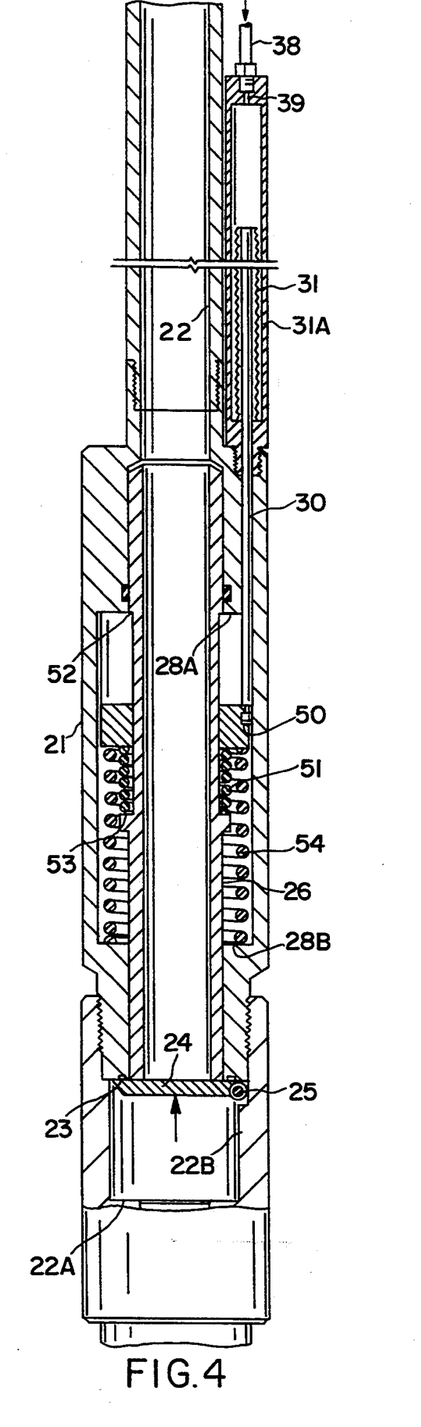
FIG. 4 is a view of the lower end of the valve similar to FIG. 2, but upon lowering of the flow tube into engagement with the flapper and with energy accumulated in the springs in response to the initial supply of control fluid through the control line.
Figure 5:
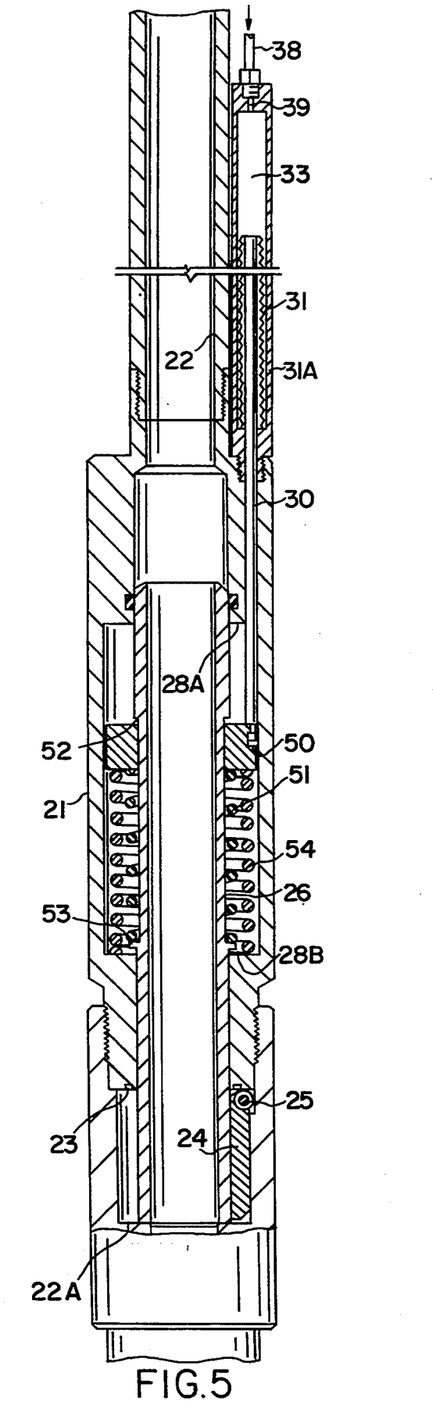
FIG. 5 is a view of the lower end of the valve, similar to FIG. 4, but upon further lowering of the flow tube to open the flapper upon equalization of pressure across the flapper.

As shown in FIGS. 4 and 5 as well as FIG. 2, a flow tube 26 is vertically reciprocable within the bore of the lower end of the body 21 between an upper position, as shown in FIGS. 2 and 4, in which it permits the flapper to close, and a lower position, as shown in FIG. 5, in which it has swung the flapper in a counterclockwise direction to its open position and moved through the seat to a position in which its lower end is engaged with a shoulder 22A about the bore to limit further downward movement. As will be described more fully hereinafter, the flow tube is yieldably urged to its upper position as shown in FIG. 2, so as to locate the lower end of the flow tube a short distance above the flapper 24. Upon lowering of the flow tube a short distance to the position shown in FIG. 4, its lower end engages the upper side of the flapper, so that further lowering of the flow tube opens the flapper, as shown in FIG. 5.

In accordance with one of the novel aspects of the present invention, the flow tube is adapted to be lowered by means of a rod 30 extending slidably through an enlarged diameter portion of the lower end of the body and connected at its upper end to the upper closed end of a metal bellows 31 which is received within a cylindrical housing 31A installed on the upper end of the enlarged body portion to one side of its upper reduced section. The lower end of the bellows is welded to the lower end of the housing about the hole in the housing through which the rod 30 extends, thus forming a space 33 in the housing outside of the bellows.

As previously described, the bellows is of a supple type which is capable of collapsing axially from its fully extended position of FIG. 2 to the collapsed position of FIG. 5 so as to lower the rod 30 a distance sufficient to move the flapper to the open position of FIGS. 4 and 5. The pressure within the bellows is, of course, that of the tubing pressure, while the pressure in the space 33 on the outside of the bellows is that of hydraulic fluid filling a displacement pressure chamber which includes the space 33. As will be described to follow, the bellows is moved to its collapsed position to lower the rod and, thus, the flow tube to open the flapper, in response to the displacement of hydraulic fluid in the chamber, upon supply of control fluid from the source at the surface, and returned to its extended position to raise the rod and permit the flow tube to be yieldably urged to its upper position to permit the flapper to close upon its displacement as the control fluid is exhausted.

As shown in FIGS. 1 and 3, a plurality of elongate metal bellows 35 are installed within an annular space 36 formed with a cylindrical housing 32 which fits over and is held on the upper end of the body 21 by means of upper and lower couplings B. More particularly, the lower open end of each bellows. 32 is welded to the lower end of the housing in surrounding relation to a passageway 37 in the housing which connects with a conduit 38, which in turn connects with a passageway 39 in the upper end of housing 31A leading to the upper end of the space 33. The space 36 is in turn connected through a passageway 41 to a control line 40, extending downwardly from a source of control fluid at the surface, as well-known in this art.

As previously described, the bellows 35 are relatively stiff and thus individually incapable of being axially collapsed to the distance required to lower the flow tube.

As shown in FIGS. 1 to 3, a rod 34 is anchored in the lower end of housing 32 to extend within each bellows 35 to a height less than the extended bellows, and thus limits the extent to which each bellows may collapse or contract. As also previously described, the area defined between the space on the inside of the bellows 35 about the rods and the outside of the bellows 31 as well as the intervening conduits form a first pressure chamber which is filled with hydraulic fluid of such volume that its displacement by the collapse of the upper bellows 35 is reflected by collapse of the bellows 31 to the extent necessary to lower the connecting rod 30 a distance not substantially greater than that required to open the flapper. Thus, each of the relatively stiff bellows is required to collapse a relatively small amount, as compared to the collapse of the bellows 31, and, more particularly, with eight as shown, only one-eighth of that of the bellows 31, the number of stiff bellows to the number of soft bellows.

This assumes, of course, that there is substantially no differential pressure across the flapper so that the flow tube can move it to its open position. Thus, the only pressure differential across the bellows 35 is that which exists when they are moved to their fully limited positions. The actuator bellows 31, on the other hand, when collapsed to lower the flow tube and thus open the flapper, sees only the differential pressure necessary to move the flow tube downwardly against the force with which it is yieldably urged toward closed position.

The lower end of the rod 30 is connected to a ring 50 which is disposed within a recess 28 between the flow tube and body 21 for vertical reciprocation with respect to both. More particularly, the ring is urged upwardly toward an upper shoulder 52 on the flow tube by means of a coil spring 51 acting between the ring and an upper shoulder formed on a flange 53 about the flow tube. The ring 50 is urged upwardly against the upper end 28A of the recess 28 by means of another coil spring 54 acting between the lower end 28B of the recess and the lower side of the ring 50.

As shown in FIG. 2, when the ring 50 is engaged with shoulder 52 on the flow tube, it is spaced below the upper end 28A of the recess. Also, the upper end of the flow tube is below a downwardly facing shoulder on the bore of the valve body. Consequently, the bellows 31 is free to expand in the event of expansion of the hydraulic fluid, so that the hydraulic fluid acts as a limit stop rather than shoulders on the body, which could damage the bellows. In like fashion, of course, the lower end of the flow tube is above the flapper so that it can move down if the fluid contracts.

As illustrated in FIG. 4, the supply of control fluid to displace fluid in the displacement chamber will collapse the bellows and thus move the rod 30 and ring 50 down. In the event the flapper has pressure differential across it resisting its opening movement, the ring 50 compresses spring 51 as well as spring 54. Consequently, when the pressure differential across the flapper is removed, the energy stored in the fully collapsed spring 51 will move the flow tube downwardly to open the flapper, even though the bellows 31 has already been collapsed due to displacement of hydraulic fluid.

As shown, the flow tube moves downwardly into engagement with limit shoulder 22A about the bore of the body to hold the flapper in a recess 22B above the shoulder. As shown in FIG. 5, with the flow tube fully lowered, the lower side of flange 53 is spaced above the lower end of the recess 28, and the upper end of ring 50 is spaced below shoulder 52. Consequently, the flow tube is permitted to be fully lowered despite expansion or contraction of the hydraulic fluid. That is, again the fluid rather than shoulders on the flow tube determines its position.

Figures 6, 7, 8:
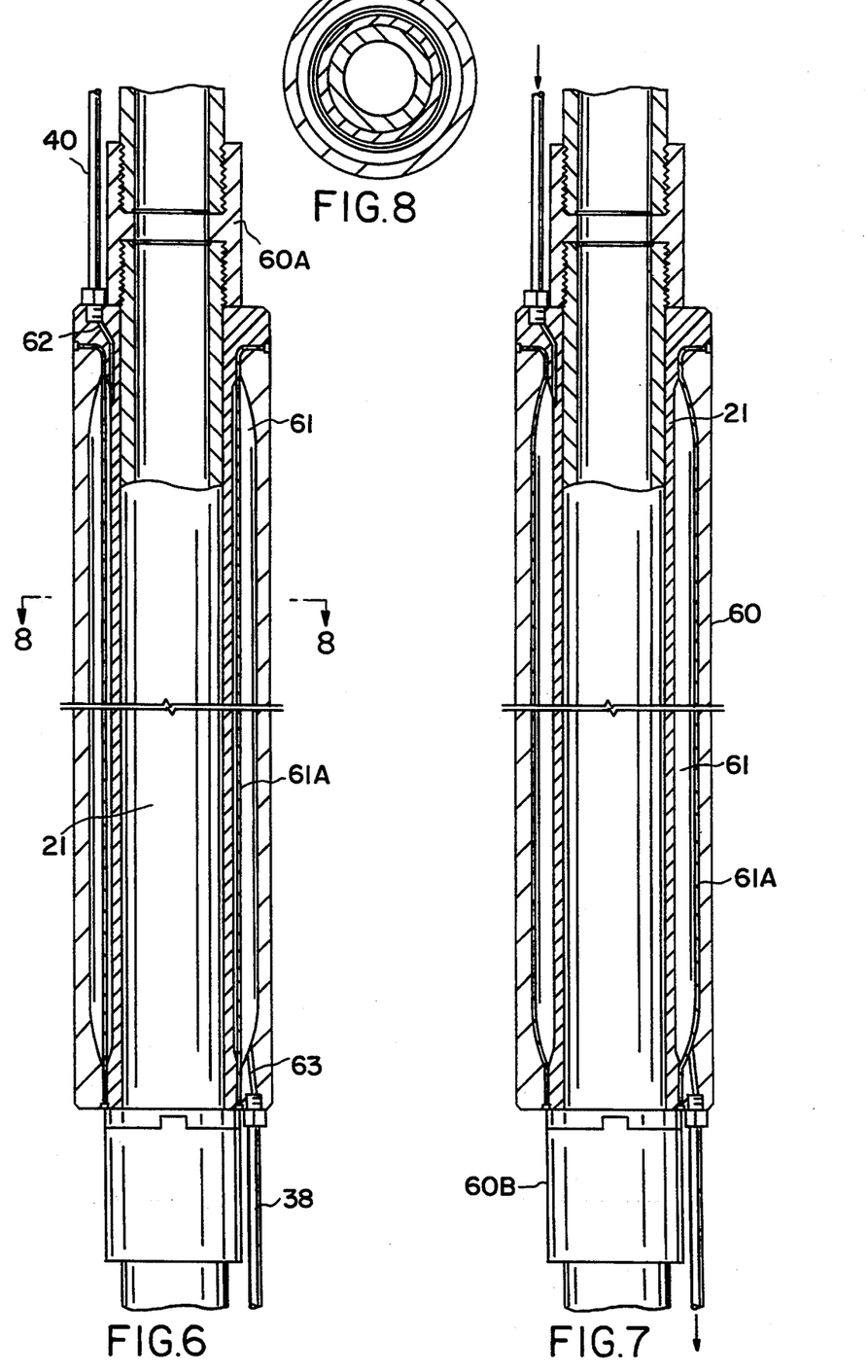
FIG. 6 is a longitudinal sectional view of the upper end of a tubing safety valve constructed in accordance with still another embodiment of the present invention, and having a load-limiting diaphragm to which control fluid may be supplied through the control line in order to open the valve.
FIG. 7 is a view of the upper end of the valve, similar to FIG. 6, but upon the supply of control fluid to the diaphragm so as to lower the flow tube installed in the lower end of the valve.
FIG. 8 is a cross-sectional view of the valve of FIGS. 6 and 7, as seen along broken lines 8—8 of FIG. 6.

The upper end of the valve illustrated in FIGS. 6 to 8 differs from that above described, in the manner in which the load due to the supply of control fluid is limited. Thus, in this case, a cylindrical housing 60 surrounds and is mounted on the tubular body by means of couplings 60A and 60B to form an annular space 61. The space is divided by means of a flexible metal diaphragm 61A having its upper and lower ends anchored to the housing which, when unflexed, is of cylindrical shape. Thus, as can be seen from FIG. 6, the diaphragm divides the pressure chamber between its outside side and the outer side of the bellows 31 from a second chamber connecting with the control line 40. Thus, as shown, the lower end of the control line 40 connects with a passageway 62 in the housing leading to the inside of the diaphragm, while a passageway 63 therein connects the outside of the diaphragm with the conduit 38 leading to the space 33 about bellows 31.

More particularly, the space 61 and diaphragm are so proportioned that when the diaphragm is flexed outwardly from the position of FIG. 6 to the position of FIG. 7 to engage the outer wall of the space, it will displace a volume of hydraulic fluid which is just sufficient to collapse the bellows 31 in order to lower the flow tube a distance just necessary to open the flapper. As will be appreciated, the diaphragm may be strong enough to resist high hydrostatic control pressure in the event the valve is installed at a great depth beneath the surface. Then, of course, upon exhaust of the hydraulic control fluid through the conduit 40, the diaphragm 61A would be free to flex inwardly to its original position of FIG. 6 so that the bellows 31 may expand and the flow tube may move upwardly to permit the flapper to close.

Figure 9:
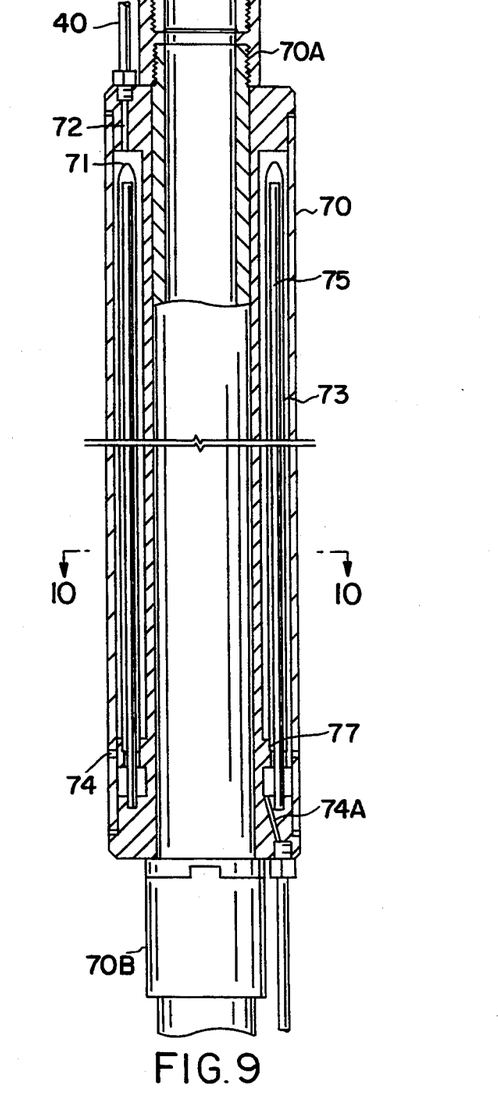
FIG. 9 is a vertical sectional view of the upper end of a valve constructed in accordance with a still further embodiment of the present invention, prior to the supply of control fluid through the control line to a load-limiting series of tubes in order to open the valve.
Figure 10:
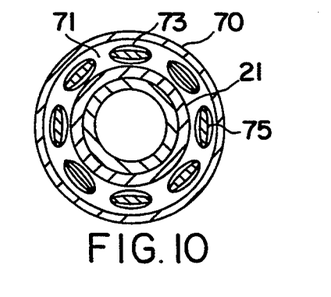
FIG. 10 is a cross-sectional view of the valve of FIG. 10, as seen along broken lines 10—10 of FIG. 9.

In the embodiment of the valve shown in FIGS. 9 and 10, the tubular body 21 is surrounded by a cylindrical housing 70 to form an annular space 71 connecting at its upper end with the lower end of the control line 40 by means of a passageway 72. As in the case of the prior valve, housing 70 is mounted on the body by means of couplings 70A and 70B. More particularly, a plurality of flexible metal tubes 73 are mounted about the space, with each of their lower open ends connected to a hole 74 leading to a passageway 74A connecting to conduit 38 leading to the space 33 about bellows 31. As shown, a metal rod 75 extends upwardly within each tube 73 to a position near the upper closed end of the tube so as to prevent their total collapse. The volume of fluid between the expanded tubes and the rods, plus that in the space 33 and connecting conduits forming the displacement chamber, is just that required to open the flapper. As shown, the lower ends of the tubes pass through a restriction 77 in the lower portion of the space above the passageway 74.

Figures 11, 11A, 12:
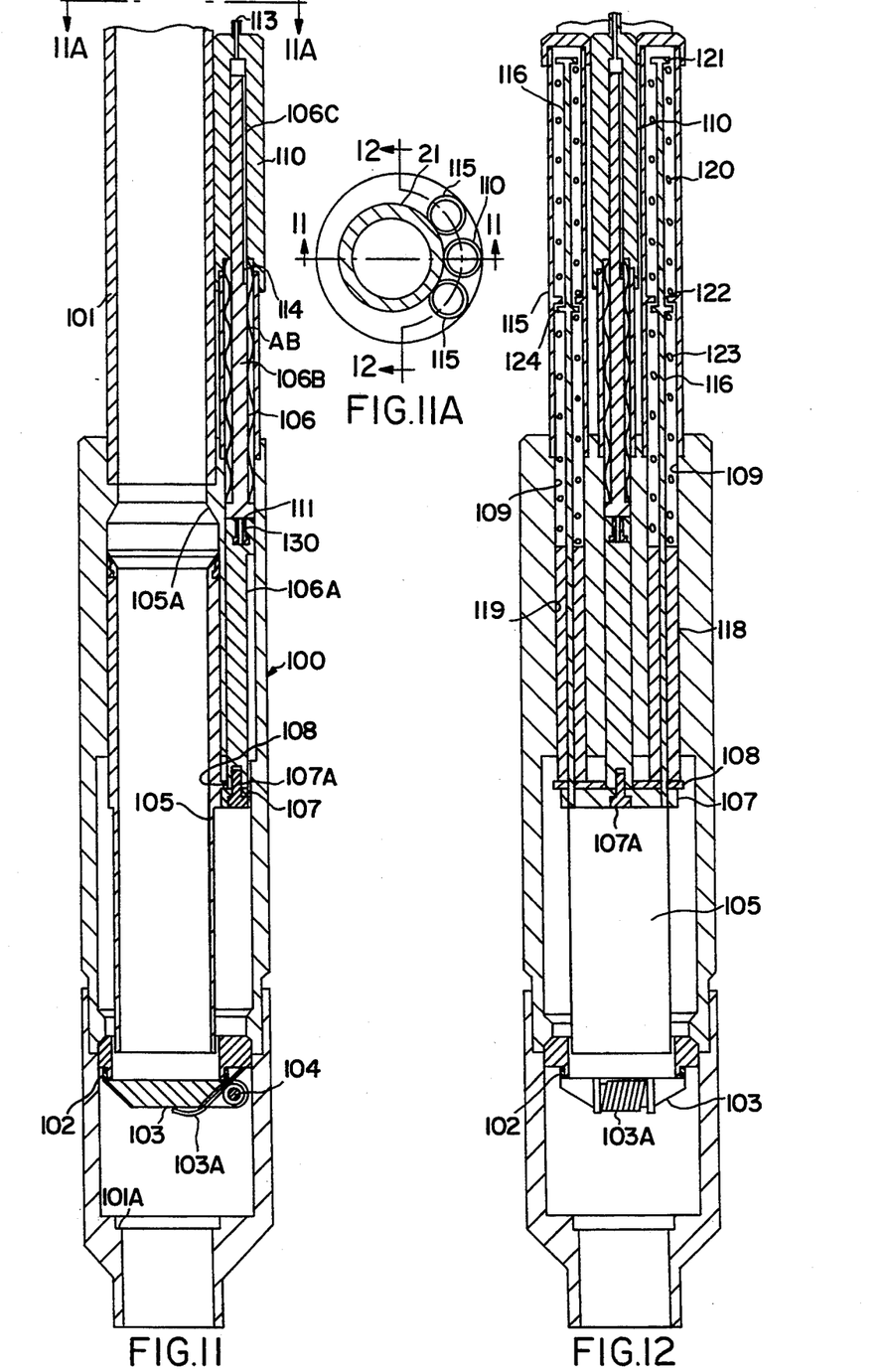
FIG. 11 is a vertical sectional view of the lower end of a valve constructed in accordance with the preferred embodiment of the invention, as seen along broken lines 11—11 of FIG. 11A, and showing the flow tube in its raised position to permit the flapper to close.
FIG. 11A is a view of the top of the lower end of the valve of FIG. 11, as seen from broken lines 11A—11A.
FIG. 12 is a vertical sectional view of the lower part of the valve of FIG. 11, as seen along broken lines 12—12 of FIG 11.

Since the rods prevent the tubes from being totally collapsed, exhaust of hydraulic control fluid through the control line 40 will enable the tubes to be expanded to their unflexed positions, as shown in FIGS. 10 and 11, as hydraulic fluid in the displacement chamber moves back into the inside of the tubes.

The alternative and preferred embodiment of the valve illustrated in FIGS. 11-18 comprises, as in the case of the above described embodiments, a tubular body 100 connectible at its upper and lower ends as part of a tubing string suspended within a well casing (not shown). Only the lower end of the valve is illustrated in these figures, the upper end being constructed similarly to any one of those illustrated and described in connection with FIGS. 1 and 3, 6 to 8 or 9 and 10 of the previously described valve embodiments. As in the case of the previously described valves, the body 100 has a bore 101 therethrough which forms a continuation of the inner diameter of the tubing string, and which has a seat 102 about the lower end of the bore adapted to be opened and closed by means of a flapper 103 pivotally mounted to one side of the bore by means of a pin 104 mounted at its opposite ends in the body. As well-known in the art, and as was the case in the prior valves, the flapper is normally urged to the closed position in FIGS. 11-14 by means of a torsion spring 103A.

As in the case of the prior valves, a flow tube 105 is vertically reciprocable within the body between an upper position, as shown in FIGS. 11 and 12, wherein its lower end is spaced above the upper side of the flapper 103, so that the flapper may close, and a lower position, as shown in FIGS. 15-18, in which it has swung the flapper in a counterclockwise direction to its open position and moved through the seat to a position in which its lower end is engaged with a shoulder 101A about the bore to limit further downward movement of the flapper. In a manner to be described more fully hereinafter, the flow tube is yieldably urged to its upper position, so as to raise its lower end above the flapper, as shown in FIGS. 11 and 12. However, upon lowering of the flow tube to the position of FIGS. 13 and 14, in response to the supply of control fluid from the source at the surface level, the lower end of the flow tube engages the upper side of the flapper, and thus is positioned to swing the flapper to open position upon further lowering of the flow tube.

Again, as in the case of the previously described embodiments of the valve, flow tube 105 is adapted to be lowered by a rod 106 connected to a pressure-responsive actuator in response to the supply of control fluid, and raised, upon exhaust of the control fuid, by means of a spring arrangement to be described.

The lower end of rod 106 is vertically reciprocable with respect to the body and secured at its lower end to an arcuately shaped thrust plate 107 by means of bolt 107A, the plate 107 being held in a position beneath a shoulder on the lower side of a flange 108 about the flow tube. More particularly, and as shown, the lower portion of the body in which the flow tube is disposed is eccentric with respect to the axis of the flow tube and thus the axis of the bore 101 so as to provide a space between the flow tube and outer wall of the body in which the rod and arcuately shaped thrust plate may reciprocate.

As shown in FIGS. 11 and 12, the upper end 106B of the rod is received in a cylindrical housing 110 threadedly or otherwise removably mounted to one side of the tubular body above its eccentric portion and extending parallel thereto. More particularly, the lower end of the housing 110 is connected to a bore in the eccentric portion of the body which receives the lower end 106A of the rod, while the upper end thereof has a reduced bore in which the upper end 106B of the rod is guidably received.

A bellows AB of similar construction to the actuating bellows in the previously described valves is received in an enlarged lower end of the bore in housing 110 and has an upper open end which is welded to the upper end of the housing to surround the rod 106 and a lower end which is welded to a flange 111 about the rod. Thus, the bellows separates well fluid on its outer side from hydraulic fluid adapted to be displaced in a pressure chamber on its inner side, and a bypass slot 106C in the rod to fluidly connect the inner side of the bellows with a conduit 38 connecting with a load limiting device, as described in any of the previous embodiments, whereby the bellows is expanded to lower the rod in response to the supply of control fluid to the load limiting device.

The upper end of the displacement chamber may be the inside of the bellows shown in FIGS. 1 and 2 or the outside of the diaphragm shown in FIGS. 6–8 or the inside of the collapsible tubes shown in FIGS. 9 and 10. In any case, upon the supply of control fluid, hydraulic fluid is displaced into the bellows AB to lengthen or expand it in an axial direction and thus lower the rod 106 so as to in turn permit the flow tube to be lowered to open the valve. Obviously, upon exhaust of control fluid from the control line, the bellows AB is permitted to collapse or shorten in an axial direction to allow the flapper to close, as will be described to follow.

As shown in FIGS. 11A and 12, a pair of housings 115 are threadedly or otherwise removably mounted on the outside of the upper end of the body 100 above the eccentric portion thereof and on opposite sides of housing 110 to connect with bores 109 in such enlarged portion. These housings and the-bores contain spring arrangements for yieldably urging the flow tube to its upper position. For this purpose, a rod 116 extends vertically through each housing and bore as well as through thrust or push bars 118 guidably reciprocable in the bores in the eccentric body portion for threaded connection at their lower ends to the thrust plate 107 disposed within the eccentric space in the housing between the flow tube and the tubular body.

As shown, each spring arrangement includes an upper coil spring 120 which is compressed between a flange 121 on the upper end of the rod and a flange 122 within the housing 115 intermediate its upper and lower ends. Each spring arrangement also includes a coil spring 123 compressed between an intermediate flange 124 formed about the rod 116 and the upper end of a push bar 118. Thus, upon lowering of the rod 106, in response to the supply of control fluid, spring 120 is compressed between the flanges 121 and 122, and spring 123 is compressed between the flange 124 and the upper ends of the push bars 118.

The spring 123 acting between the flange 124 and the upper end of the push bar 118 applies a clamping force to the flange 108 about the flow tube to trap it between the thrust plate 107 and the thrust bars. Thus, the flow tube will move downwardly as if it were directly connected to the rod 106 until the resistance of the flow tube movement exceeds the preload of the springs 123. These latter springs serve to limit the resistive force that can be applied to the bellows AB and thus limit the pressure differential across the opposite ends of the rod 106 and bellows throughout the stroke of the bellows.

In the fully closed position of the valve shown in FIGS. 10 and 11, prior to the supply of control fluid, the lower end of the flow tube is raised above the top side of the flapper, and its upper end is spaced below a restriction 105A in the bore 101 so that it has free vertical movement. Thus, as in the previously described valve, the position of the flow tube is determined by the volume of liquid in the displacement chamber, which is particularly useful in those situations in which the displacement liquid may expand or contract, or, of course, in those cases in which there may be close vertical tolerances.

For example, the volume of the displacement liquid may be reduced slightly by pressure, or its volume may be slightly increased by an increase in temperature. Thus, this freedom of movement of the flow tube upwardly or downwardly will ensure that the flapper remains closed and the differential pressure across the rod 106 secured to the actuating bellows will not be affected by well pressure or temperature, or close tolerances.

Figure 13:
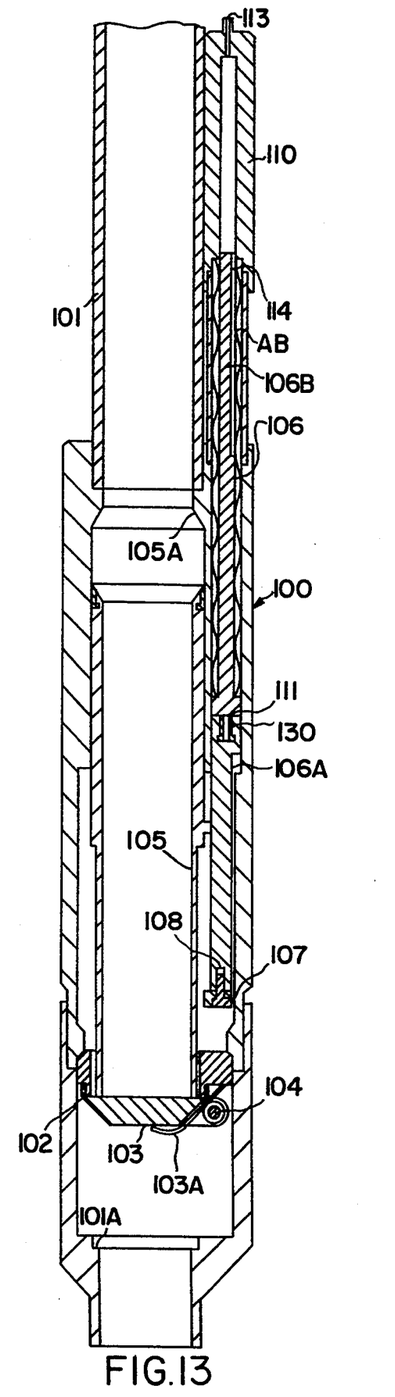
FIGS. 13 and 14 are views of the valve similar to FIGS. 11 and 12, respectively, but upon the supply of control fluid to lower the flow tube into engagement with the upper side of the flapper.
Figure 14:
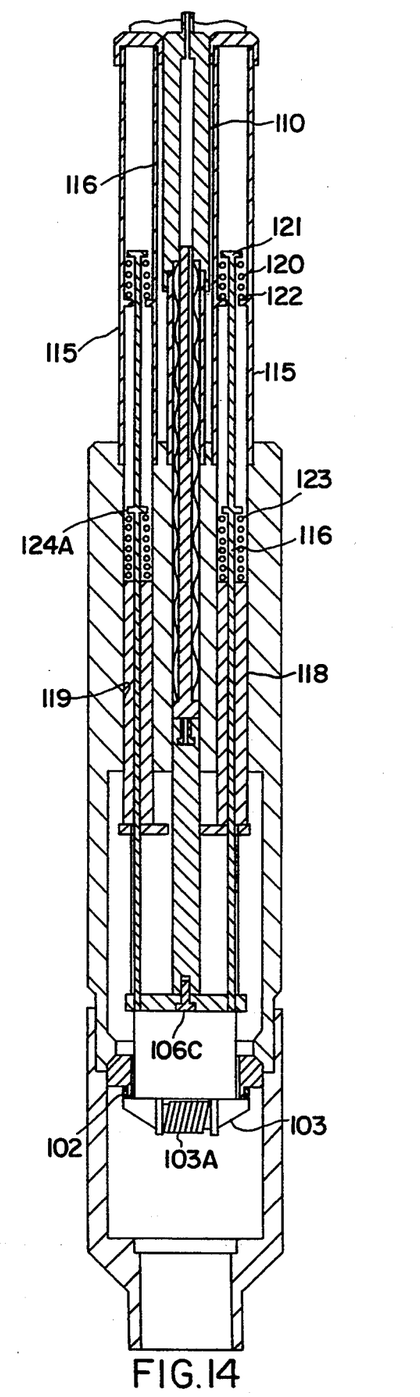

At this time, of course, the pressure within the control line and thus in the displacement chamber in the upper end of the valve is the hydrostatic head of the control fluid, which in turn depends on the depth at which the valve is installed, so that the pressure within the bellows and the displacement chamber is well pressure plus pressure induced by the springs 120 acting on the rods 116. When well control pressure is supplied to the upper wall of the displacement chamber to displace fluid into the actuating bellows AB, the rod 106 is moved downwardly so as to lower the thrust plate 107. Lowering the thrust plate, through its connection to the rods 116, will then compress the springs 120 and 123, as shown in FIGS. 13 and 14.

Since the flange 108 about the flow tube is only initially held between the thrust bar and thrust plate by the spring 123, the flow tube will move downwardly only until its lower end engages the upper side of the flapper. The continued downward movement of the rod 106 will therefore compress the lower spring 123, as shown in FIG. 14. In this position, the vertical position of the rod 106 is determined only by the volume between the displacement fluid, whereby the freedom of movement of the rod 106, despite changes in the volume of the displacement fluid, does not force the rod against the closed flapper so that pressure differential across the ends of the rod and the actuating bellows is not affected by well pressure or temperature. At this stage, the pressure within the actuating bellows AB, and thus in the displacement chamber as a whole, is well pressure above the closed flapper plus the pressure induced by the upper springs 120 and lower springs 123 acting upon the end of the rod 106.

In this position, the lower springs 123 act upon the push bars 118 to urge the flow tube downwardly. Thus, when the differential pressure is removed from the flapper, the maintenance of control pressure will permit the lower springs 123 to urge the push bars downwardly on flange 108 about the flow tube so as to lower the flow tube to the position shown in FIGS. 15 and 16 in order to open the flapper. The rod 106, on the other hand, is in the same position it occupied in FIGS. 13 and 14. The pressure within the bellows AB is well pressure plus the pressure induced by the springs acting on the rod 106. The effects of thermal and pressure changes are no different from that described in connection with FIGS. 13 and 14, although the pressure differential acting across the ends of the rod 106 and the actuating bellows is slightly less than the closed position of FIGS. 13 and 14 due to the reduced compression of the lower spring 123.

Normally, removal of control pressure from above the displacement chamber would permit the valve to return to the closed position of FIG. 1. Thus, displacement of fluid upwardly through the tube 113 will draw fluid from the actuating bellows AB to permit the rod 106, the thrust plate 107, the push bars 118, and the rods 116 to move upwardly due to the urging of the upper springs 120 acting on the flange 121 and the lower springs 123 acting on the flange 124. The lower springs acting on the thrust bars will continue to hold the flow tube down until the thrust plate contacts the flange on the flow tube, at which time continued removal of displacement fluid causes the flow tube to continue to move upwardly due to the continued urging of the upper springs, whereby the flapper may be urged closed by the torsion spring 103A.

Figure 15:
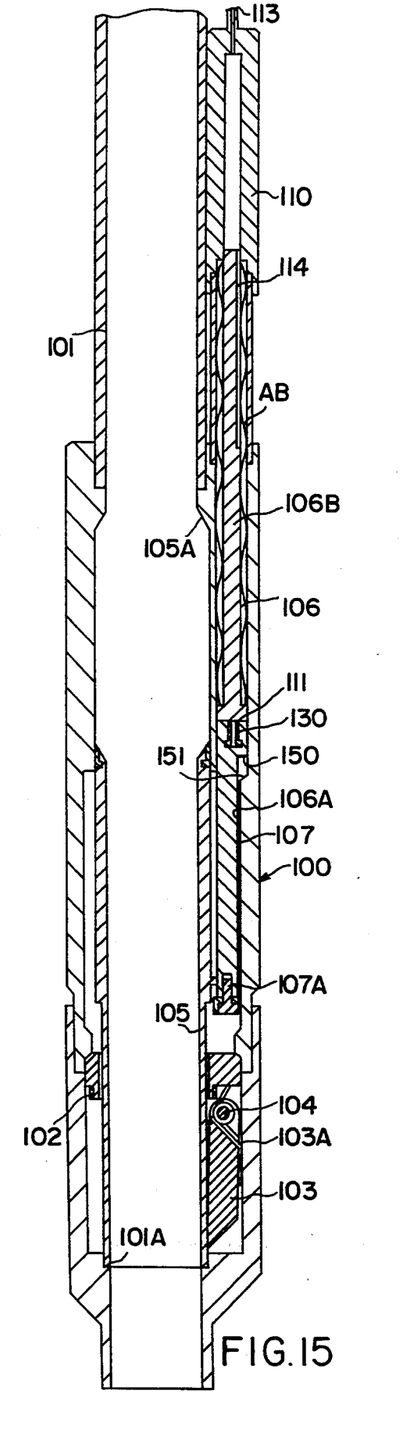
FIGS. 15 and 16 are further views of the valve similar to FIGS. 13 and 14, respectively, but upon further lowering of the flow tube to open the flapper.
Figure 16:
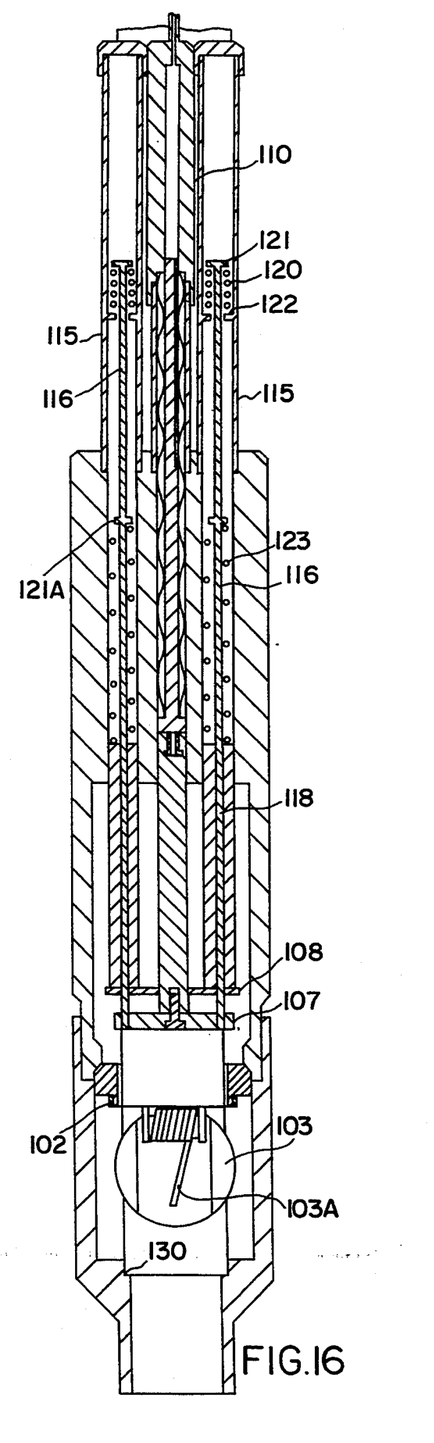

In the event the raising of the flow tube from the position of FIGS. 15 and 16 is resisted, the exhaust of control fluid from above the displacement chamber will cause the rod 106 to be pulled upwardly. That is, displacement of fluid from the actuating bellows AB will cause the rod 106, the thrust plate, the push bars, and the actuating rods 116 to move upwardly due to the urging of the upper springs 120 and the lower springs 123. The lower springs 123 will continue to act on the push bars 118 to hold the flow tube down until the thrust plate contacts the shoulder on the flow tube.

As shown in FIG. 15, the lower end 106B of the rod is guidably slidable in the eccentric space of the body, and has a shoulder 150 which is spaced above a shoulder 151 at the upper end of the guide surface on the space. Also, the flange 108 is spaced above the top of thrust plate 107. Thus, as in the prior described valve embodiments, the rod 106 is free to move up or down due to expansion or contraction of the displacement fluid, without damage to the bellows—i.e., the fluid itself defines the upper and lower limits of rod movement.

Figure 17:
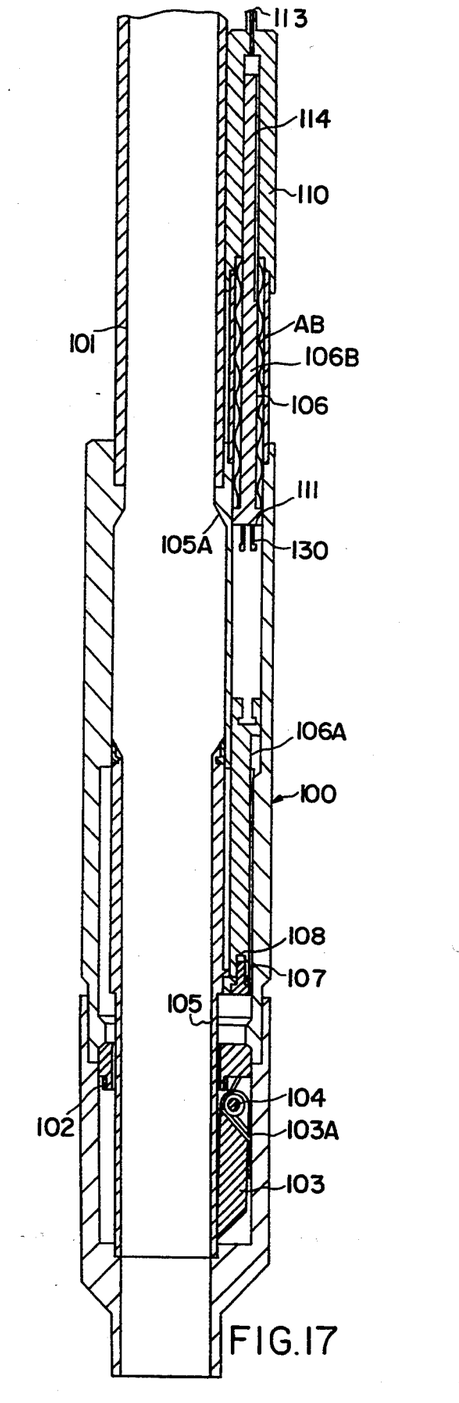
FIGS. 17 and 18 are still further views of the valve similar to FIGS. 15 and 16, respectively, but upon separation of the actuator rod upon failure of the flow tube to rise.
Figure 18:
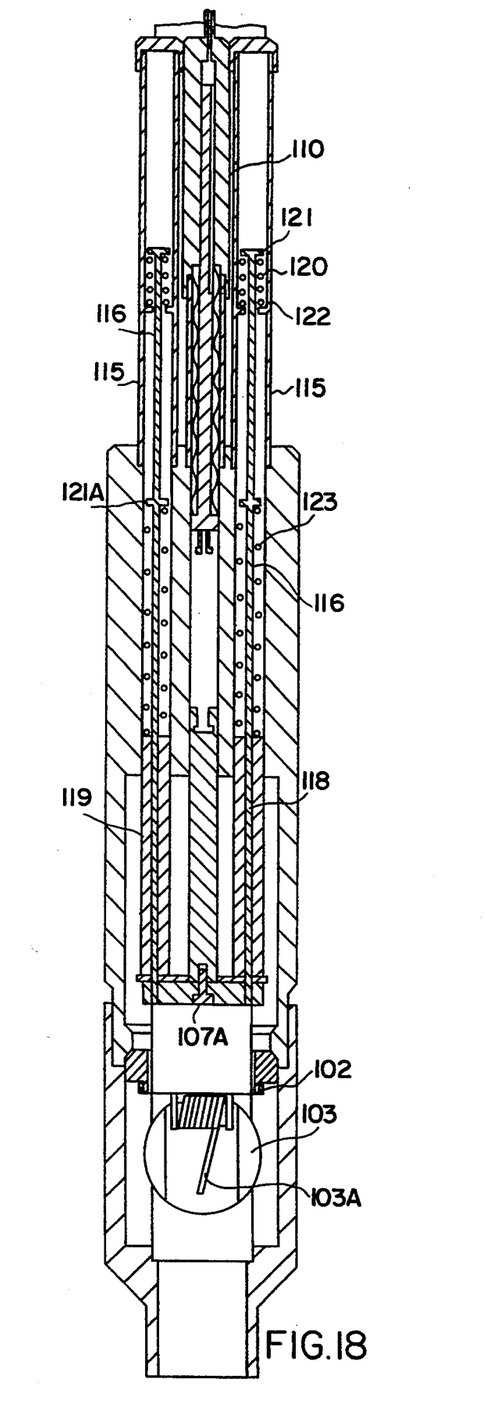

If the flow tube does resist upward movement, continued removal of control fluid causes well pressure acting on the lower end of the rod 106 to exceed the pressure of the displacement fluid acting on the upper end of the rod. To avoid damage to the actuating bellows, which would otherwise occur, the upper and lower ends 106A and 106B of the rod are connected, as by means of a collet 130, which is released, as shown in FIGS. 17 and 18, in response to a predetermined upward force, to limit the differential pressure on the bellows by permitting the upper end 106B of the rod to move upwardly and thus the bellows to move with it.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A surface controlled, subsurface tubing safety valve, comprising
    a tubular body having a bore therethrough disposable in a tubing string,
    a closure member movable within the body between positions opening and closing the bore,
    means yieldably urging the closure member to closed position,
    a flow tube vertically reciprocable within the body,
    means yieldably urging the flow tube to an upper position to permit the closure member to close, and
    means for lowering the flow tube to open the closure member, comprising
        means including a pressure-responsive member having well pressure on one side and connected to the flow tube so as to lower the flow tube to open the closure member in response to the displacement of hydraulic fluid in a first chamber on the other side of the pressure responsive member,
        means including a flexible metal membrane means which divides the first chamber on one side thereof from a second chamber on the other side thereof to which control fluid from a source at the surface may be supplied in order to displace hydraulic fluid in the first chamber, and
        means in the second chamber which limits flexure of the membrane means, responsive to the supply of control fluid thereto, so that the volume of hydraulic fluid displaced in the first chamber is not substantially greater than that required to lower the flow tube to open the closure member.

2. A valve of the character defined in claim 1, and wherein
    the pressure responsive member is a metal bellows.

3. A valve of the character defined in claim 2, wherein
    the means connected to the flow tube includes a rod extending through an open end of the bellows.

4. A valve of the character defined in claim 2, wherein
    the first pressure chamber is on the outside of the bellows to contract the bellows to lower the flow tube.

5. A valve of the character defined in claim 2, wherein
    the first pressure chamber is inside of the bellows to expand the bellows to lower the flow tube.

6. A valve of the character defined in claim 1, including means for accumulating energy in response to the displacement of the hydraulic fluid, but prior to opening of the closure member, and then releasing the accumulated energy to lower the flow tube to open the closure member upon a substantial balance of pressure across the closure member.

7. A valve of the character defined in claim 6, wherein
    the pressure responsive member is a bellows, and the means for accumulating and releasing energy comprises first and second spring means acting between a rod extending through an open end of the bellows and flow tube and between the rod and valve body.

8. A valve of the character defined in claim 1, wherein
    the means including the flexible metal membrane means comprises
        a plurality of elongate second metal bellows each having an open end connected to the first chamber so that control fluid is on the outer side thereof and hydraulic fluid in the first chamber is on the inside thereof, and
    means within the second bellows to limit the extent to which they may be collapsed an thus the volume of hydraulic fluid to be displaced thereby.

9. A valve of the character defined in claim 1, wherein
    the means including the metal membrane means comprises
        a flexible metal diaphragm dividing the first and second chambers from one another,
        the diaphragm being flexible into engagement with a wall in the first chamber to limit its displacement.

10. A valve of the character defined in claim 1, wherein
    the means including the metal membrane means comprises a plurality of flexible tubes open at one end to connect with the first chamber and surrounded by control fluid in the second chamber, and means in each tube onto which each tube collapses to limit the volume of hydraulic fluid displaced.

11. A surface controlled, subsurface tubing safety valve, comprising a tubular body having a longitudinal bore therethrough connectible in a tubing string and an upper laterally reduced portion and a lower laterally enlarged portion, a flapper pivotally mounted in the lower portion of the body for swinging between positions opening and closing the bore, said lower body portion having a chamber to one side of the bore to receive the flapper in its open position, means yieldably urging the flapper to closed position, a flow tube vertically reciprocable within the lower portion of the body, a housing mounted on the lower portion of the body to one side of and generally parallel to the upper reduced portion thereof, means including a pressure-responsive member forming a pressure chamber to which control fluid from a source at the surface may be supplied or from which such control fluid may be exhausted, means connecting the pressure-responsive member to the flow tube so as to lower the flow tube to open the flapper upon the supply of control fluid to the chamber, and longitudinally extending spring means disposed at least partially within the housing to act between the housing and connecting means to yieldably urge the flow tube to an upper position to permit the flapper to close upon exhaust of control fluid, the axis of said spring means extending through said flapper receive chamber.

12. A valve of the character defined in claim 11, including a second housing mounted on the body to one side of and generally parallel to the first housing and the upper reduced portion of the body, said pressure-responsive member being disposed within the second housing, and said connecting means comprises a rod extending from the second housing and into the lower body portion.

13. A valve of the character defined in claim 12, wherein said spring means is compressed between the rod and first housing, and said connecting means comprises a second rod extending from the first housing into the lower body portion, and means extending laterally between the rods within the lower body portion to connect them.

14. A valve of the character defined in claim 12, wherein the housing is removably connected at its lower end to the upper end of the lower enlarged portion of the body to permit replacement of the spring means.

15. As in 11, wherein the upper and lower body portions are cylindrical and eccentric to one another.

16. A surface controlled, subsurface tubing safety valve, comprising a tubular body having a longitudinal bore therethrough connectible in a tubing string and an upper reduced portion and a lower laterally enlarged portion, a flapper pivotally mounted within the lower portion of the body between positions opening and closing the bore, said lower body portion having a chamber to one side of the bore to receive the flapper in its open position, means yieldably urging the flapper to closed position, a housing mounted on the lower portion of the body to one side of and generally parallel to the upper reduced portion thereof, means including a pressure-responsive member forming a pressure chamber to which control fluid from a source at the surface may be supplied or from which such control fluid may be exhausted, means extending from the pressure-responsive member and into the lower enlarged body portion to connect with the flapper member for opening the flapper upon the supply of control fluid to the chamber, and longitudinally extending spring means disposed at least partially within the housing and acting between the housing and means which connects with the flapper to yieldably urge the flapper opening means to an upper position to permit the flapper to close upon exhaust of control fluid, the axis of said spring means extending through said flapper receiving chamber.

17. A valve of the character defined in claim 16, including a second housing mounted on the body to one side of and generally parallel to the first housing and the upper reduced portion of the body, said pressure-responsive member being disposed within the second housing.

18. A valve of the character defined in claim 16, wherein the housing is removably connected at its lower end to the upper end of the lower enlarged portion of the body to permit replacement of the spring means.

19. A surface controlled, subsurface tubing safety valve, comprising a tubular body having a bore therethrough disposable in a tubing string, a closure member movable within the body between positions opening and closing the bore, means yieldably urging the closure member to closed position, a flow tube vertically reciprocable in the body, an actuator rod extending parallel to the flow tube, a first flange extending laterally from one side of the flow tube, first spring means being held between oppositely facing shoulders connected to the actuator rod and on the body to urge the rod upwardly, second spring means held between the upper side of the first flange and an oppositely facing shoulder on the actuator rod to urge the flow tube downwardly, a second flange extending laterally from one side of the actuator rod which is urged by said first spring means against the lower side of the first flange, the axes of the body and flow tube being eccentric to provide a relatively wide space between them, said flanges being of arcuate shape and one above the other within said space, and means to move the rod downwardly and thus open the closure member responsive to the pressure of control fluid which is supplied from the surface and to permit the rod to move upwardly and thereby permit the closure member to move to closed position, upon exhaust of control fluid.

20. As in claim 19, wherein the closure member is a flapper, the means move the rod downwardly includes a pressure chamber containing hydraulic fluid which is displaced to lower the rod in response to the supply of control fluid, and prior to such supply, the first spring means raises the flow tube to a position on which its lower end is spaced above the flapper.

* * * * *